United States Patent [19]
Godfrey et al.

[11] Patent Number: 5,338,001
[45] Date of Patent: Aug. 16, 1994

[54] VALVE APPARATUS

[75] Inventors: Craig W. Godfrey, Richardson; Timothy J. Noack, Dumas; Kenneth L. Schwendemann, Lewisville, all of Tex.

[73] Assignee: Halliburton Company, Houston, Tex.

[21] Appl. No.: 977,384

[22] Filed: Nov. 17, 1992

[51] Int. Cl.⁵ ............................................. F16K 5/20
[52] U.S. Cl. ................................. 251/58; 251/170; 251/192
[58] Field of Search ............. 251/58, 170, 192, 315

[56] References Cited

U.S. PATENT DOCUMENTS

| | | | |
|---|---|---|---|
| 2,819,035 | 1/1958 | Graham | 251/170 |
| 3,083,945 | 4/1963 | Shafer et al. | 251/170 X |
| 3,385,370 | 5/1968 | Knox et al. | 166/225 |
| 3,409,078 | 11/1968 | Knox et al. | 166/21 |
| 3,509,913 | 5/1970 | Lewis | 251/58 X |
| 3,767,162 | 10/1973 | Olsson | 251/192 X |
| 3,874,414 | 4/1975 | Dollison | 137/625.66 |
| 3,874,634 | 4/1975 | Gazda | 251/319 |
| 4,113,018 | 9/1978 | Barrington et al. | 166/334 |
| 4,319,633 | 3/1982 | McMahan et al. | 166/250 |
| 4,368,871 | 1/1983 | Young | 251/58 |
| 4,372,392 | 2/1983 | Barrington et al. | 166/373 |
| 4,420,045 | 12/1983 | McMahan | 166/334 |
| 4,421,171 | 12/1983 | Haynes | 251/58 X |
| 4,421,172 | 12/1983 | McMahan | 166/334 |
| 4,618,000 | 10/1986 | Burris, II | 166/373 |
| 4,651,828 | 3/1987 | Doremus | 166/319 |
| 4,673,033 | 6/1987 | Minear et al. | 166/55.1 |
| 4,691,779 | 9/1987 | McMahan et al. | 166/321 |
| 5,050,839 | 9/1991 | Dickson et al. | 251/58 |

OTHER PUBLICATIONS

Brochure entitled "Super Tree II—How Advanced Engineering Has Optimized Safety in a New Subsea Test Tree," published in 1991 by Halliburton Reservoir Services, P.O. Box 721110, 5950 North Course Drive, Houston, Tex. 77272.

*Primary Examiner*—Stephen M. Hepperle
*Attorney, Agent, or Firm*—Tracy W. Druce; Dennis D. Brown

[57] ABSTRACT

A valve assembly comprising: a valve seat having a first end, a second end, and a valve seat passageway extending therethrough from said first end to said second end; a valve ball assembly rotatably positionable adjacent the second end of the valve seat passageway for selectively sealing the valve seat passageway; a first control arm connectable between the valve seat and the valve ball assembly, the connection between the first control arm and the valve ball assembly defining an axis of rotation for the valve ball assembly; a sealing member, reciprocatably positionable in the valve seat passageway adjacent the second end of the valve seat, for preventing fluid flow between the second end of the valve seat and the exterior of the valve ball assembly; and an urging member, positionable in the passageway, for urging the sealing member against the valve ball assembly.

31 Claims, 4 Drawing Sheets

VALVE APPARATUS

FIELD OF THE INVENTION

The present invention relates to valves useful in downhole operations. More particularly, but not by way of limitation, the present invention relates to safety valves which are leak proof in two directions.

BACKGROUND OF THE INVENTION

Examples of safety valves useful for downhole operations are disclosed in U.S. Pat. No. 5,050,839 issued to Dickson et al. The entire disclosure of U.S. Pat. No. 5,050,839 is incorporated herein by reference. The assignee of U.S. Pat. No. 5,050,839 is also the assignee of the present application.

Each of the safety valves disclosed in U.S. Pat. No. 5,050,839 utilizes a valve assembly comprising: a valve housing; a ball assembly which is reciprocatably positionable in the valve housing; and a pair of ball assembly control arms which are held in fixed position in the valve housing. The ball assembly includes: a valve seat having a passageway extending therethrough from the top of the valve seat to the bottom of the valve seat; a ball valve rotatably positioned adjacent the bottom of the valve seat for selectively sealing the valve seat passageway; a pair of control arms connected between the valve seat and the ball valve such that (a) the control arms hold the ball valve adjacent the bottom of the valve seat and (b) the connections between the control arms and the ball valve define an axis of rotation for the ball valve; a first coupling disc connected to the ball valve and positioned between the ball valve and one of the control arms; and a second coupling disc connected to the ball valve and positioned between the ball valve and the other control arm. Each of the control frames used in the Dickson et al. valve assembly provides a single stationary lug member. The stationary lug member of one control frame projects into an aperture formed in one of the coupling discs while the stationary lug member of the other control frame projects into an aperture formed in the other coupling disc. The two stationary lug members are directly opposed to each other and lie outside of the axis of rotation of the ball valve. Consequently, when the ball assembly is reciprocated in the valve housing with respect to the stationary lug members, the stationary lug members cause the ball valve to rotate. Thus, by causing the ball assembly to reciprocate in the valve housing, the Dickson et al. safety valve can be opened and closed.

In FIGS. 1 and 2 of U.S. Pat. No. 5,050,839, Dickson et al. disclose a subsurface safety valve having a design directed toward preventing the occurrence of galling between the valve seat and the ball valve when the ball valve is rotated from its closed position to its open position. As explained by Dickson et al., valve galling tends to occur when a ball valve is rotated from closed position to open position due to the fact that, when the ball valve is in closed position, the high relative formation pressure acting on the bottom of the ball valve urges the ball valve strongly against the valve seat. In the subsurface safety valve depicted by Dickson et al. in FIGS. 1 and 2, the coupling discs used in the Dickson et al. valve assembly are designed such that, as the ball valve is rotated from its closed position to its open position, the control discs tend to urge the ball valve away from the valve seat.

In FIGS. 10 and 11 of U.S. Pat. No. 5,050,839, Dickson et al. disclose a safety valve design which is particularly well suited for use in a subsurface test tree. In this embodiment, the coupling discs used in the valve assembly are designed such that, as the ball valve is rotated about its axis of rotation toward its closed position, the coupling discs of the Dickson et al. valve assembly tend to urge the ball valve toward the valve seat. Consequently, as the ball valve is rotated to its closed position, the ball valve can readily cut a wire or reeled tubing which has been extended through the safety valve.

As will be appreciated by those skilled in the art, subsurface safety valves of type disclosed in U.S. Pat. No. 5,050,839 have a significant shortcoming. This shortcoming is substantially alleviated by the present invention. In a safety valve of the type disclosed in U.S. Pat. No. 5,050,839, the control arms linking the valve seat and the ball valve must provide sufficient play between the ball valve and the valve seat to allow the ball valve to be rotated. As indicated above, when the ball valve is closed, the formation pressure acting on the bottom of the ball valve will normally be substantially greater than the tubing pressure acting on the top of the ball valve. The resulting pressure differential urges the ball valve tightly against the bottom of the valve seat such that the safety valve is prevented from leaking. However, if the tubing pressure acting on the top of the closed ball valve is caused to exceed the formation pressure, the resulting pressure differential urges the ball valve away from the bottom of the valve seat such that the high pressure fluid in the tubing above the ball valve is allowed to flow past the ball valve and into the formation.

If the tubing pressure acting on the top of the ball valve is substantially greater than the formation pressure, the resulting amount and rate of fluid leakage into the formation can be sufficient to damage the formation. For example, as will be understood by those skilled in the art, when a subsea test tree containing a safety valve of the type in question is "unlatched," the ocean water above the safety valve may suddenly exert a tremendous amount of hydrostatic pressure on the top of the ball valve. The hydrostatic pressure exerted on the top of the ball valve urges the ball valve away from the valve seat such that a large amount of ocean water can be allowed to flow into the formation.

SUMMARY OF THE INVENTION

The present invention provides a valve assembly comprising: a valve seat; a ball valve; at least one control arm connectable between the valve seat and the ball valve; a sealing means; and an urging means. The valve seat has a first end, a second end, and a passageway extending through the valve seat from said first end to said second end. The ball valve is rotatably positionable adjacent the second end of the passageway for selectively sealing the passageway. The connection between the control arm and the ball valve defines an axis of rotation for the ball valve. The sealing means is reciprocatably positionable in the passageway of the valve seat adjacent the second end of the valve seat and is operable for preventing fluid flow between the second end of the valve seat and the exterior of the ball valve. The urging means is also positionable in the passageway of the valve seat and is operable for urging the sealing means against the ball valve.

The present invention also provides a valve assembly comprising: a valve seat having a first end and a second end and a passageway extending through the valve seat from said first end to said second end; a ball valve rotatably positionable adjacent the second end of the valve seat passageway for selectively sealing the passageway; a first control arm connectable to the valve seat and connectable to the ball valve; a second control arm connectable to the valve seat and connectable to the ball valve; a floating seat positionable in the valve seat passageway adjacent the second end of the valve seat; and an urging means, positionable in the valve seat passageway, for urging the floating seat against the ball valve. The connection between the first control arm and the ball valve is directly opposed to the connection between the second control arm and the ball valve such that the connection between the first control arm and the ball valve and the connection between the second control arm and the ball valve define an axis of rotation for the ball valve.

The present invention additionally provides a valve apparatus comprising: a housing; an assembly positionable in the housing; and at least one operating lug positionable in the housing. The assembly comprises: a valve seat having a first end and a second end and a valve seat passageway extending through the valve seat from said first end to said second end; a ball valve which is rotatably positionable adjacent the second end of the valve seat passageway for selectively sealing the valve seat passageway; a control arm connectable between the valve seat and the ball valve; a floating seat positionable in the valve seat passageway adjacent the second end of the valve seat; and an urging means, positionable in the valve seat passageway, for urging the floating seat against the ball valve. The ball valve has a passageway extending therethrough. Additionally, the connection between the control arm and the ball valve defines an axis of rotation for the ball valve. The valve apparatus also comprises at least one operating lug which is positionable in the housing and is associatable with the ball valve. The association between the operating lug and the ball valve lies outside of the axis of rotation of the ball valve. Additionally, either the assembly or the operating lug is a reciprocating component which is reciprocatable in the housing while the other of these components is a fixed component which is positionable in fixed position in the housing. As a result, the ball valve can be rotated about its axis of rotation by reciprocating the reciprocating component in the housing.

The present invention further provides a valve assembly comprising: a valve seat having a first end, a second end, and a valve seat passageway extending through the valve seat from the first end to the second end; a valve ball assembly rotatably positionable adjacent the second end of the valve seat for selectively sealing the valve seat passageway; a first control arm connectable between the valve seat and the valve ball assembly; a floating seat positionable in the valve seat passageway adjacent the second end of the valve seat; and urging means, positionable in the valve seat passageway, for urging the floating seat against the valve ball assembly. The connection between the control arm and the valve ball assembly defines an axis of rotation for the valve ball assembly. The valve ball assembly comprises a ball valve. The valve ball assembly preferably also comprises a coupling member which is connectable to the exterior of the ball valve and which is rotatably connectable to the control arm.

The present invention also provides a valve apparatus which includes a housing and a valve assembly positionable in the housing. The valve assembly comprises: a valve seat having a first end, a second end, and a valve seat passageway extending through the valve seat from said first end to said second end; a ball assembly rotatably positionable adjacent the second end of the valve seat passageway for selectively sealing the valve seat passageway; a control arm connectable between the valve seat and the ball assembly; a floating seat positionable in the valve seat passageway adjacent the second end of the valve seat; and an urging means, positionable in the valve seat passageway, for urging the floating seat against the ball assembly. The ball assembly comprises a ball valve having a passageway extending therethrough. The connection between the control arm and the ball assembly defines an axis of rotation for the ball assembly. The valve apparatus also includes at least one operating lug which is positionable in the housing and is connectable to the ball assembly. The connection between the operating lug and the ball assembly lies outside of the axis of rotation of the ball assembly. Further, one of said valve assembly and said operating lug is a reciprocating component which is reciprocatable in the housing while the other of these components is positionable in fixed position in the housing. Consequently, the ball assembly can be rotated about its axis of rotation by reciprocating the reciprocating component in the housing.

The inventive valve apparatus substantially alleviates the safety valve leakage problem discussed hereinabove. As indicated, the inventive valve apparatus generally includes: a valve seat; a ball valve; at least one control arm which holds the ball valve adjacent the lower end of the valve seat; a floating seat which is positioned in the passageway of the valve seat; and an urging means, positioned in the valve seat passageway, which continually urges the floating seat against the ball valve. Thus, even if the pressure acting on top of the ball valve substantially exceeds the formation pressure acting on the bottom of the ball valve such that the ball valve is urged away from the valve seat, the urging means of the inventive valve apparatus maintains the floating seat in sealing engagement with the ball valve and thus prevents the inventive valve apparatus from leaking.

Further objects, features, and advantages of the present invention will be readily apparent to those skilled in the art upon reference to the accompanying drawings and upon reading the following description of the preferred embodiments.

DESCRIPTION OF THE PREFERRED EMBODIMENTS

Figure 1:
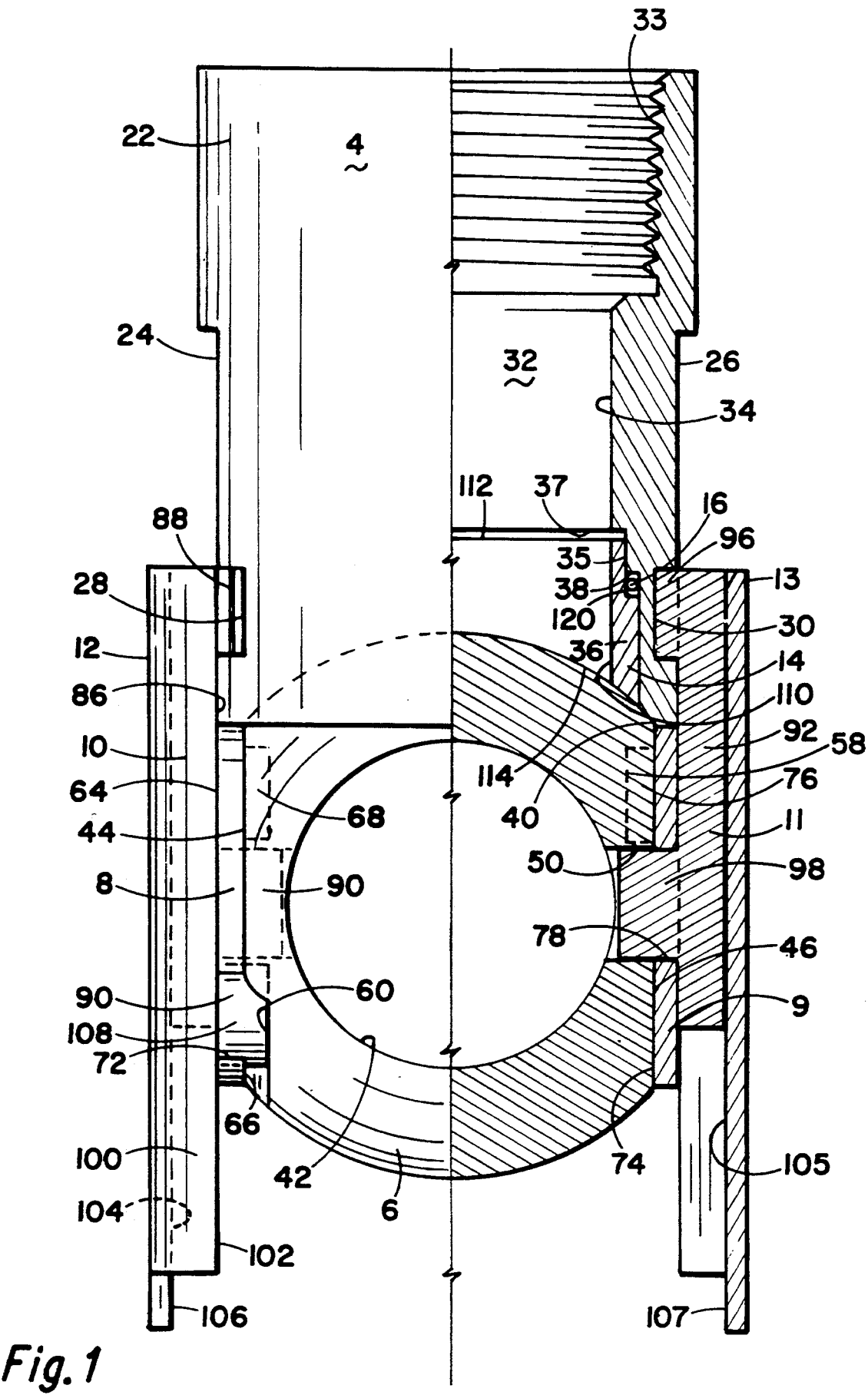
FIG. 1 provides an elevational, partially cutaway side view of a preferred embodiment 2 of the valve apparatus of the present invention.

An embodiment 2 of the valve apparatus of the present invention is illustrated in FIGS. 1, 2A, 2B, and 3. Inventive valve apparatus 2 comprises: a valve seat 4; a ball valve 6 which is rotatably positionable adjacent valve seat 4; coupling discs 8 and 9 which are connectable to the sides of ball valve 6; control arms 10 and 11 which are connectable between the valve seat and the ball valve; control frames 12 and 13 which are associatable with coupling discs 8 and 9 and are operable for slidably receiving control arms 10 and 11; a floating seat 14 positionable in valve seat 4; and a resilient member 16 which is operable for urging floating seat 14 against ball valve 6.

Valve seat 4 has a first end 18, a second end 20, and a cylindrical exterior surface 22. A flat surface 24 extending from second end 20 of valve seat 4 is formed on one side of cylindrical exterior surface 22. An identical flat surface 26 is formed on the opposite side of cylindrical exterior surface 22. A lateral groove 28 having a substantially rectangular cross section is formed across flat surface 24. An identical lateral groove 30 is formed across flat surface 26. A passageway 32 extends longitudinally through valve seat 4 from the first end 18 to the second end 20 of valve seat 4. Passageway 32 includes: a threaded bore 33 extending from first end 18; a first cylindrical bore 34 adjacent threaded bore 33; a second cylindrical bore 35 adjacent cylindrical bore 34 and having an inside diameter greater than the inside diameter of cylindrical bore 34; a third cylindrical bore 36 adjacent cylindrical bore 35 and having an inside diameter greater than the inside diameter of cylindrical bore 35; a radial surface 37 defined by the transition from first cylindrical bore 34 to second cylindrical bore 35; a radial surface 38 defined by the transition from second cylindrical bore 35 to third cylindrical bore 36; and a curved surface 40 extending between second cylindrical bore 36 and the second end 20 of valve seat 4. The curvature of curved surface 40 matches the curvature of the exterior of ball valve 6.

Ball valve 6 is a generally spherical member having a cylindrical passageway 42 extending therethrough. Ball valve 6 includes: a first flat surface 44 formed in the exterior of ball valve 6; a matching second flat surface 46 formed in the exterior of ball valve 6 directly opposite first flat surface 44; a cylindrical aperture 48 formed through the center of flat surface 44; a matching cylindrical aperture 50 formed through the center of flat surface 46; a cylindrical cavity 56 formed in flat surface 44 adjacent cylindrical aperture 48; a matching cylindrical cavity 58 formed in flat surface 46 adjacent aperture 50; a tab-shaped cavity 60 formed in flat surface 44 adjacent cylindrical aperture 48; and an identical tab-shaped cavity formed in flat surface 46 adjacent aperture 50. Cylindrical cavity 56 formed in flat surface 44 is directly opposed to cylindrical cavity 58 formed in flat surface 46. Further, tab-shaped cavity 60 formed in flat surface 44 is directly opposed to the tab-shaped cavity formed in flat surface 46.

Coupling disc 8 comprises: a flat outside surface 64; a flat inside surface 66 which is positionable against flat surface 44 of ball valve 6; and a cylindrical boss 68 formed on inside surface 66 which is receivable in cylindrical cavity 56 of ball valve 6. Coupling disc 8 also includes a cylindrical aperture 70 which extends through the center of disc 8 and a tab-shaped aperture 72 positioned adjacent cylindrical aperture 70. Cylindrical aperture 70 and tab-shaped aperture 72 substantially correspond, respectively, to cylindrical aperture 48 and tab-shaped cavity 60 of ball valve 6.

Coupling disc 9 is identical to coupling disc 8. Coupling disc 9 includes: a flat inside surface 74 which is positionable against flat surface 46 of ball valve 6; a cylindrical boss 76 formed on surface 74 which is receivable in cylindrical cavity 58 of ball valve 6; a cylindrical aperture 78 extending through the center of coupling disc 9 which substantially corresponds to cylindrical aperture 50 of ball valve 6; and a tab-shaped aperture 80 which substantially corresponds to the tab-shaped cavity formed in surface 46 of ball valve 6.

Control arm 10 comprises an elongate member 82 having a flat outside surface 84, a flat inside surface 86, and a substantially rectangular cross-sectional shape. A lateral cross member is attached to inside surface 86 at or near one end of elongate member 82. The cross-sectional shape of lateral cross member 88 corresponds to the cross-sectional shape of lateral groove 28 formed in valve seat 4. Thus, cross member 88 is receivable in lateral groove 28 for connecting control arm 10 to valve seat 4. Cylindrical boss 90 is formed on inside surface 86 at or near the other end of elongate member 82. Cylindrical boss 90 is sized to extend through cylindrical aperture 70 of coupling disc 8 and into cylindrical aperture 48 of ball valve 6.

Coupling arm 11 is identical to coupling arm 10. Coupling arm 11 includes: an elongate member 92 having a flat inside surface 94; a lateral cross member 96 connected to inside surface 94 at or near one end of elongate member 92; and a cylindrical boss 98 formed on inside surface 94 at or near the other end of elongate member 92. Lateral cross member 96 of control arm 11 is receivable in lateral groove 30 of valve seat 4. Cylindrical boss 98 of coupling arm 11 is sized to extend through cylindrical aperture 78 of coupling disc 9 and into cylindrical aperture 50 of ball valve 6.

Control frame 12 is an elongate member comprising: a semi-cylindrical outside surface 100; a flat inside surface 102; an elongate rectangular groove 104 formed in inside surface 102 and extending from one end of control frame 12 to the other end of control frame 12; a tab 106 (or, alternatively, a slot) extending from (or into) one end of control frame 12 for securing control frame 12 in fixed position in a valve housing; and a cylindrical lug 108 formed on inside surface 102 adjacent one side of rectangular groove 104. The cross-sectional shape of rectangular groove 104 corresponds to the cross-sectional shape of elongate member 82 of control arm 10 such that elongate member 82 of control arm 10 is slidably receivable in rectangular groove 104. Cylindrical lug 108 of control frame 12 is receivable in tab-shaped aperture 72 of coupling disc 8. If desired, cylindrical lug 108 can be sized to extend through the tab-shaped aperture 72 of coupling disc 8 and into tab-shaped cavity 60 of ball valve 6.

Control frame 13 is a mirror image duplicate of control frame 12. Control frame 13 includes: a flat inside surface 103; an elongate rectangular groove 105 formed in surface 103; a tab 107 formed at one end of control frame 13 for holding control frame 13 in fixed position in a valve housing; and a cylindrical lug 109 formed on inside surface 103 adjacent one side of rectangular groove 105. The cross-sectional shape of elongate rectangular groove 105 corresponds to the cross-sectional shape of elongate member 92 of control arm 11 such that elongate member 92 of control arm 11 is slidably receivable in elongate groove 105. Cylindrical lug 109 of control frame 13 is receivable in tab-shaped aperture 80 of coupling disc 9. If desired, cylindrical lug 109 can be sized to extend through tab-shaped aperture 90 and into tab-shaped cavity 62 of ball valve 6.

Floating seat 14 comprises: a cylindrical interior surface 110; a radial first end 112; a curved second end 114; a first cylindrical exterior surface 116 extending from the outer edge of radial first end 112; a second cylindrical exterior surface 118 adjacent cylindrical exterior surface 116 and extending to the outer edge of curved second end 114, second cylindrical exterior surface 118 having an outside diameter larger than the outside diameter of first cylindrical exterior surface 116; and a radial exterior surface 120 defined by the transition from first cylindrical exterior surface 116 to second cylindrical exterior surface 118.

First cylindrical exterior surface 116 of floating seat 14 is receivable in second cylindrical bore 35 of valve seat 4 and second cylindrical exterior surface 118 of floating seat 14 is receivable in third cylindrical bore 36 of valve seat 4. The curvature of curved end 114 of floating seat 14 corresponds to the exterior curvature of ball valve 6.

Resilient member 16 is positionable between radial interior surface 38 of valve seat 4 and radial exterior surface 120 of floating seat 14. As discussed above, resilient member 16 operates to urge the curved end of floating seat 14 against the exterior of ball valve 6. Examples of resilient members suitable for use in inventive apparatus 2 include springs and O-rings. Resilient member 16 is preferably an O-ring.

Inventive apparatus 2 is assembled by: connecting coupling discs 8 and 9 to flat surfaces 44 and 46 of ball valve 6 such that cylindrical boss 68 of disc 8 is received in cylindrical cavity 56 of ball valve 6 and cylindrical boss 76 of coupling disc 9 is received in cylindrical cavity 58 of ball valve 6; inserting resilient member 16 into cylindrical bore 36 of valve seat 4 such that resilient member 16 rests against radial surface 38 of valve seat 4; inserting floating seat 14 into cylindrical bore 36 of valve seat 4 such that resilient member 16 rests between radial exterior surface 120 of floating seat 14 and radial interior surface 38 of valve seat 4; inserting cylindrical boss 90 of control arm 10 through cylindrical aperture 70 of coupling disc 8 and into cylindrical aperture 48 of ball valve 6; placing lateral cross member 88 of control arm 10 in lateral groove 28 of valve seat 4; inserting cylindrical boss 98 of control arm 11 through cylindrical aperture 78 of coupling disc 9 and into cylindrical aperture 50 of ball valve 6; placing lateral cross member 96 of control arm 11 in lateral groove 30 of valve seat 4; associating control frame 12 with apparatus 2 by (a) inserting cylindrical lug 108 of frame 12 through tab-shaped aperture 72 of control disc 8 and into tab-shaped cavity 60 of ball valve 6 and (b) placing elongate member 82 of control arm 10 in rectangular groove 104 of frame 12; and associating control frame 13 with valve apparatus 2 by (a) inserting cylindrical lug 109 of frame 13 through tab-shaped aperture 80 of coupling disc 9 and into tab-shaped cavity 62 of ball valve 6 and (b) placing elongate member 92 of control arm 11 in rectangular groove 105 of control frame 13.

Figure 2A:
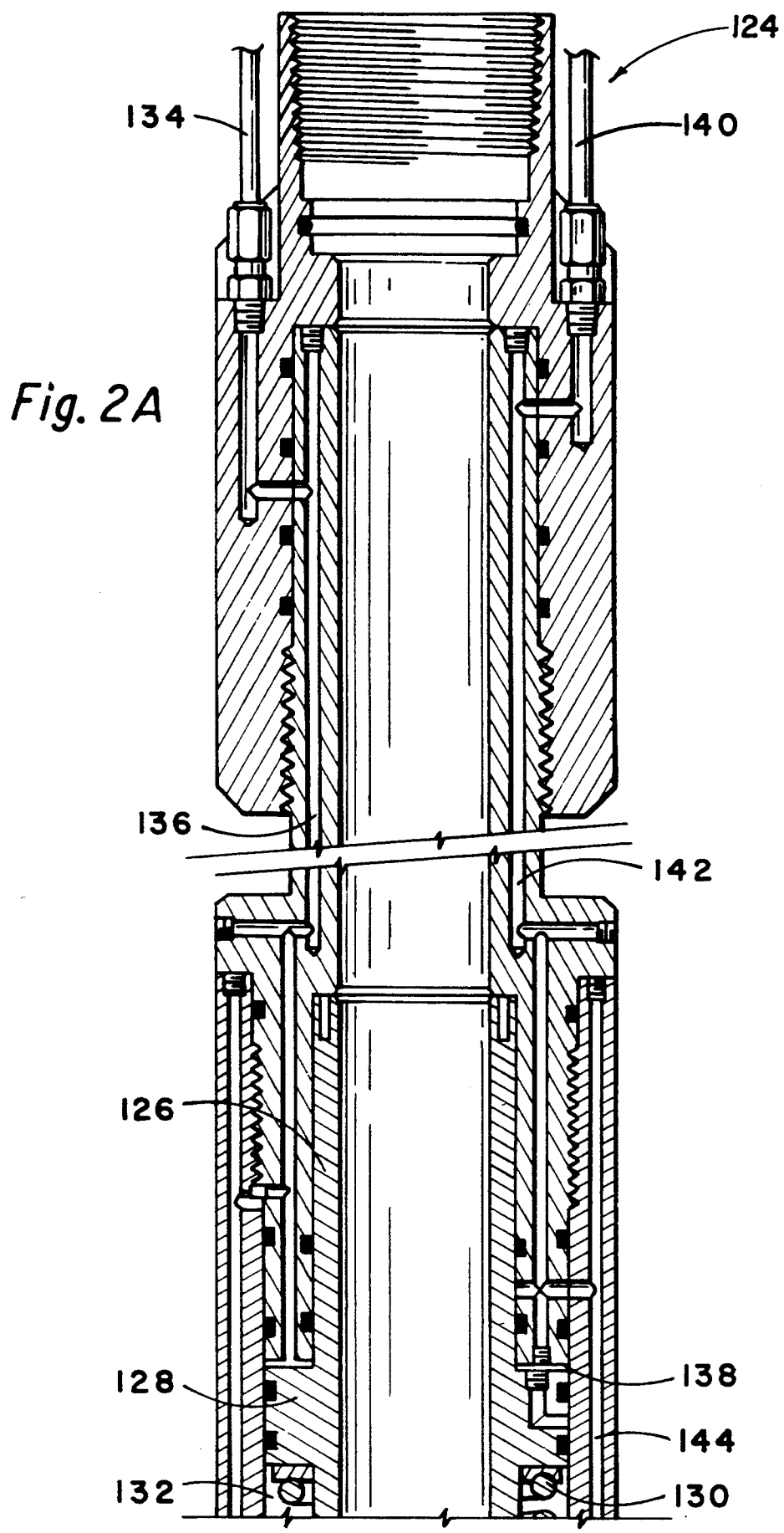
FIGS. 2A and 2B provide an elevational cutaway side view of a safety valve which includes inventive valve apparatus 2.
Figure 2B:
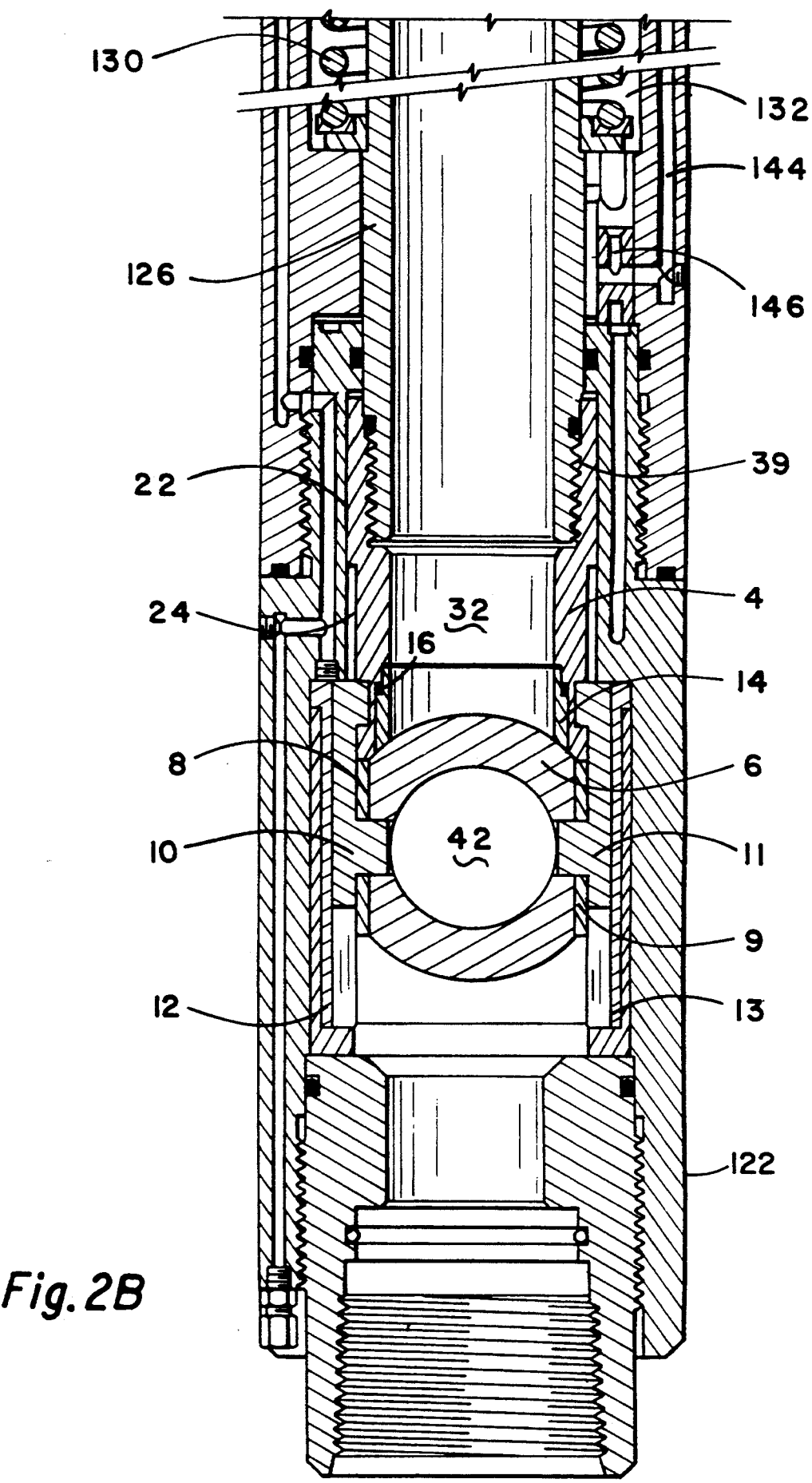
Figure 3:
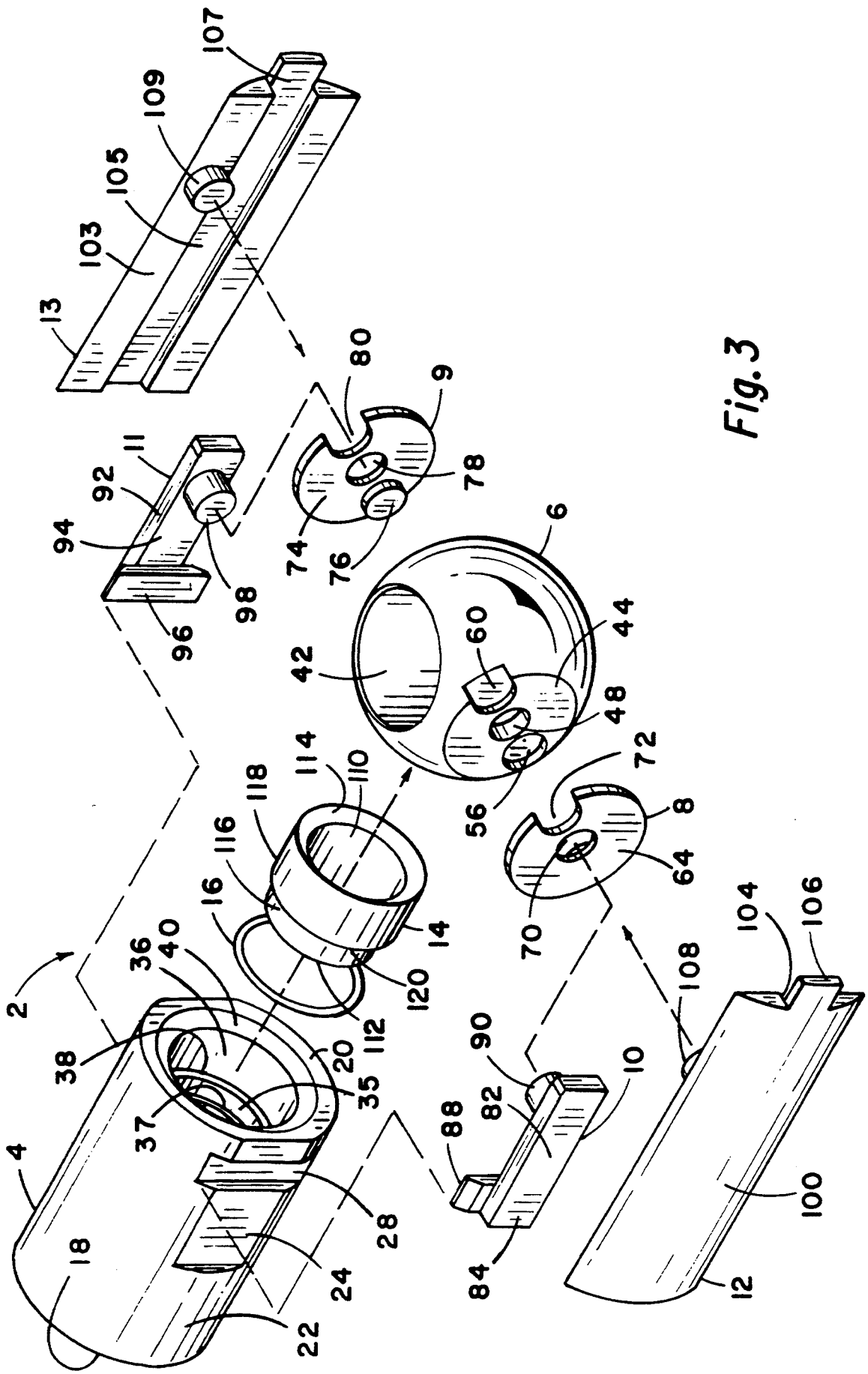
FIG. 3 provides an exploded isometric view of inventive valve apparatus 2.

As depicted in FIGS. 2A and 2B, inventive valve apparatus 2 is preferably positioned in a valve housing 122 such that control frames 12 and 13 are held in fixed position in housing 122 and the remainder of apparatus 2 is reciprocatable in housing 122. However, as will be understood by those skilled in the art, inventive valve apparatus 2 can be modified such that control frames 12 and 13, or similar members, are reciprocatable in housing 122 while the remainder of inventive apparatus 2 is held in fixed position in housing 122.

Control arms 10 and 11 hold ball valve 6 and coupling discs 8 and 9 adjacent the second end 20 of valve seat 4. Additionally, cylindrical boss 90 of control arm 10 is directly opposed to cylindrical boss 98 of control arm 11 such that bosses 90 and 98 define an axis of rotation for ball valve 6 and for coupling discs 8 and 9. Ball valve 6 and coupling discs 8 and 9 are rotatable about this axis of rotation to (a) allow fluid flow out of passageway 32 of valve seat 4 by placing passageway 42 of ball valve 6 in communication with passageway 32 and (b) seal passageway 32 of valve seat 4 by taking passageway 42 of ball valve 6 out of communication with passageway 32. Resilient member 16 urges curved second end 114 of floating seat 14 against the exterior of ball valve 6 such that, when valve apparatus 2 is closed (i.e., when passageway 42 of ball valve 6 is not in communication with passageway 32 of valve seat 4), floating seat 14 prevents fluid from flowing between valve seat 4 and the exterior of ball valve 6.

When control frames 12 and 13 are fixed in housing 122 and the remainder of valve apparatus 2 is reciprocated, lugs 108 and 109 of frames 12 and 13 engage the edges of tab-shaped apertures 72 and 80 of discs 8 and 9 and thus cause ball valve 6 and discs 8 and 9 to rotate about the above-mentioned axis of rotation. The operation of control discs 8 and 9 with respect to the rotation of ball valve 6 is fully discussed in U.S. Pat. No. 5,050,839, the entire disclosure of which has been incorporated herein by reference. As discussed in U.S. Pat. No. 5,050,839, coupling discs 8 and 9 can optionally be configured with respect to apertures 48 and 50 and cavities 56, 58, 60, and 62 of ball valve 6 such that the control discs operate to (a) urge ball valve 6 away from valve seat 4 when ball valve 6 is rotated from its closed position to its open position and/or (b) urge ball valve 6 toward valve seat 4 when ball valve 6 is rotated from its open position to its closed position.

FIGS. 2A and 2B depict inventive valve apparatus 2 positioned in a downhole safety valve 124. The general construction and operation of downhole safety valve 124 is fully discussed in U.S. Pat. No. 5,050,839. U.S. Pat. No. 5,050,839 also discloses an alternative downhole safety valve into which a valve apparatus provided by the present invention can be incorporated.

In downhole safety valve 124, valve seat 4 of inventive apparatus 2 is threadedly connected to the end of an actuator tube 126. Actuator tube 126 has a piston 128 formed on the exterior thereof. A spring 130 is positioned beneath piston 128 in chamber 132.

As fully described in U.S. Pat. No. 5,050,839, ball valve 6 of downhole safety valve 124 is rotated to its open position (i.e., passageway 42 of ball valve 6 is placed in communication with passageway 32 of valve seat 4) by increasing the pressure of a control fluid contained in control fluid charge line 134, control fluid conduit 136, and control fluid chamber 138. As the fluid pressure in line 134, conduit 136, and chamber 138 increases, piston 128 is forced downward. As piston 128 moves downward, actuator tube 126, valve seat 4, control arms 10 and 11, coupling discs 8 and 9, and ball valve 6 also move downward. When ball valve 6 moves downward, lugs 108 and 109 of control frames 12 and 13 engage the edges of tab-shaped apertures 72 and 80 of coupling discs 8 and 9 such that coupling discs 8 and 9 and ball valve 6 are caused to rotate about the axis of rotation defined by cylindrical bosses 90 and 98 of control arms 10 and 11. The rotation of ball valve 6 as ball valve 6 and valve seat 4 move downward places cylindrical passageway 42 of ball valve 6 in communication with passageway 32 of valve seat 4.

In order to close downhole safety valve 124, the fluid pressure in control fluid charge line 134, control fluid conduit 136, and control fluid chamber 138 can be reduced such that spring 130 is allowed to urge piston 128 upward. As also described in U.S. Pat. No. 5,050,839, the operation of spring 130 can be assisted by increasing the pressure in spring chamber 132. The pressure in spring chamber 132 is increased by pumping fluid into spring chamber 132 via balance line 140, balance conduit 142, balance conduit 144, and float valve 146.

As piston 128 is urged upward in safety valve 124, actuator tube 126, control arms 10 and 11, coupling discs 8 and 9, and ball valve 6 also move upward. When ball valve 6 moves upward, fixed lugs 108 and 109 of control frames 12 and 13 engage coupling discs 8 and 9 such that coupling discs 8 and 9 and ball valve 6 rotate about the axis of rotation defined by cylindrical bosses 90 and 98 of control arms 10 and 11. The rotation of ball valve 6 as ball valve 6 is pulled upward moves passageway 42 of ball valve 6 out of communication with passageway 32 of valve seat 4. As discussed above, when ball valve 6 is thus placed in closed position, resilient member 16 maintains floating seat 14 in sealing engagement with the exterior of ball valve 6 such that fluid is not allowed to flow between valve seat 4 and the exterior of ball valve 6.

Thus, the present invention is well adapted to carry out the objects and attain the ends and advantages mentioned above as well as those inherent therein. While presently preferred embodiments have been described for purposes of this disclosure, numerous changes and modifications will be apparent to those skilled in the art. Such changes and modifications are encompassed within the spirit of this invention as defined by the appended claims.

What is claimed is:

1. A valve assembly comprising:
   a valve seat having a first end, a second end, and a passageway extending through said valve seat from said first end to said second end;
   a ball valve rotatably positionable adjacent said second end of said passageway for selectively sealing said passageway;
   at least one control arm connectable between said valve seat and said ball valve, the connection between said control arm and said ball valve defining an axis of rotation for said ball valve;
   a sealing means, reciprocatingly positionable in said passageway adjacent said second end of said valve seat, for preventing fluid flow between said second end of said valve seat and the exterior of said ball valve; and
   urging means, positionable in said passageway, for urging said sealing means against said ball valve,
   wherein the exterior portion of said ball valve adjacent said second end of said valve seat will sealingly contact said second end of said valve seat when (a) said ball valve is positioned adjacent said second end of said valve seat, (b) said ball valve is placed in closed position for sealing said passageway, and (c) a fluid pressure exceeding the fluid pressure in said passageway is exerted on the exterior portion of said ball valve opposite said second end of said valve seat
   wherein the exterior portion of said ball valve adjacent said second end of said valve seat will move out of contact with said second end of said valve seat when (a) said ball valve is positioned adjacent said second end of said valve seat, (b) said ball valve is placed in closed position for sealing said passageway, and (c) the fluid pressure in said passageway exceeds the fluid pressure exerted on the exterior portion of said ball valve opposite said second end of said valve seat, and
   wherein said urging means continually urges said sealing means against said ball valve such that said sealing means sealingly contacts said ball valve when the fluid pressure in said passageway exceeds the fluid pressure exerted on the exterior portion of said ball valve opposite said second end of said valve seat and said sealing means sealingly contacts said ball valve when the fluid pressure in said passageway is less than the fluid pressure exerted on the exterior portion of said ball valve opposite said second end of said valve seat.

2. A valve assembly as described in claim 1 wherein:
   said valve seat has a radial interior surface inside said passageway;
   said sealing means has a radial exterior surface; and
   said urging means comprises a resilient member positionable between said radial interior surface and said radial exterior surface.

3. A valve assembly as described in claim 2 wherein said resilient member is an O-ring.

4. A valve assembly as described in claim 2 wherein:
   said ball valve has an exterior surface;
   said exterior surface has a cylindrical cavity formed therein; and
   said control arm includes a cylindrical boss which is receivable in said cylindrical cavity for providing said connection between said control arm and said ball valve.

5. A valve assembly comprising:
   a valve seat having a first end, a second end, and a passageway extending through said valve seat from said first end to said second end;
   a ball valve rotatably positionable adjacent said second end of said passageway for selectively sealing said passageway;
   a first control arm connectable to said valve seat and connectable to said ball valve;
   a second control arm connectable to said valve seat and connectable to said ball valve;
   a floating seat positionable in said passageway adjacent said second end of said valve seat; and
   urging means, positionable in said passageway, for urging said floating seat against said ball valve,
   wherein the connection between said first control arm and said ball valve is directly opposed to the connection between said second control arm and said ball valve such that the connection between said first control arm and said ball valve and the connection between said second control arm and said ball valve define an axis of rotation for said ball valve,
   wherein the exterior portion of said ball valve adjacent said second end of said valve seat will sealingly contact said second end of said valve seat when (a) said ball valve is positioned adjacent said second end of said valve seat, (b) said ball valve is placed in closed position for sealing said passageway, and (c) a fluid pressure exceeding the fluid pressure in said passageway is exerted on the exterior portion of said ball valve opposite said second end of said valve seat, wherein the exterior portion of said ball valve adjacent said second end of said valve seat will move out of contact with said second end of said valve seat when (a) said ball valve is positioned adjacent said second end of said valve seat, (b) said ball valve is placed in closed position for sealing said passageway, and (c) the fluid pressure in said passageway exceeds the fluid pressure exerted on the exterior portion of said ball valve opposite said second end of said valve seat, and wherein said urging means continually urges said floating seat against said ball valve such that said floating seat sealingly contacts said ball valve when the fluid pressure in said passageway exceeds the fluid pressure exerted on the exterior portion of said ball valve opposite said second end of said valve seat and said floating seat sealingly contacts said ball valve when the fluid pressure in said passageway is less than the fluid pressure exerted on the exterior portion of said ball valve opposite said second end of said valve seat.

6. A valve assembly as described in claim 5 wherein:
said valve seat has a radial interior surface inside said passageway;
said floating seat has a radial exterior surface; and
said urging means comprises a resilient member positionable between said radial interior surface and said radial exterior surface.

7. A valve assembly as described in claim 6 wherein said resilient member is an O-ring.

8. A valve assembly as described in claim 6 wherein:
said ball valve has a first cylindrical cavity and a second cylindrical cavity formed therein;
said first control arm includes a cylindrical boss which is receivable in said first cylindrical cavity for providing said connection between said first control arm and said ball valve; and
said second control arm includes a cylindrical boss which is receivable in said second cylindrical cavity for providing said connection between said second control arm and said ball valve.

9. A valve apparatus comprising:
a housing;
an assembly positionable in said housing, said assembly comprising:
a valve seat having a first end, a second end, and a valve seat passageway extending through said valve seat from said first end to said second end;
a ball valve having a passageway extending therethrough, said ball valve being rotatably positionable adjacent said second end of said valve seat passageway for selectively sealing said valve seat passageway,
a first control arm connectable between said valve seat and said ball valve, the connection between said first control arm and said ball valve defining an axis of rotation for said ball valve,
a floating seat positionable in said valve seat passageway adjacent said second end of said valve seat, and
urging means, positionable in said valve seat passageway, for urging said floating seat against said ball valve; and
at least one operating lug positionable in said housing and associatable with said ball valve, the association between said operating lug and said ball valve lying outside of said axis of rotation, wherein one of said assembly and said operating lug is a reciprocating component which is reciprocatable in said housing and the other of said assembly and said operating lug is a fixed component which is positionable in fixed position in said housing such that said ball valve can be rotated about said axis of rotation by reciprocating said reciprocating component in said housing, wherein the exterior portion of said ball valve adjacent said second end of said valve seat will sealingly contact said second end of said valve seat when (a) said ball valve is positioned adjacent to said second end of said valve seat, (b) said ball valve is placed in closed position for sealing said valve seat passageway, and (c) a fluid pressure exceeding the fluid pressure in said valve seat passageway is exerted on the exterior portion of said ball valve opposite said second end of said valve seat, wherein the exterior portion of said ball valve adjacent said second end of said valve seat will move out of contact with said second end of said valve seat when (a) said ball valve is positioned adjacent said second end of said valve seat, (b) said ball valve is placed in closed position for sealing said passageway, and (c) the fluid pressure in said passageway exceeds the fluid pressure exerted on the exterior portion of said ball valve opposite said second end of said valve seat, and wherein said urging means continually urges said floating seat against said ball valve such that said floating seat sealingly contacts said ball valve when the fluid pressure in said passageway exceeds the fluid pressure exerted on the exterior portion of said ball valve opposite said second end of said valve seat and said floating seat sealingly contacts said ball valve when the fluid pressure in said passageway is less than the fluid pressure exerted on the exterior portion of said ball valve opposite said second end of said valve seat.

10. A valve apparatus as described in claim 9 wherein:
said valve seat has a radial interior surface inside said valve seat passageway;
said floating seat has a radial exterior surface; and
said urging means comprises a resilient member positionable between said radial interior surface and said radial exterior surface.

11. A valve apparatus as described in claim 10 wherein said resilient member is an O-ring.

12. A valve apparatus as described in claim 10 wherein said assembly is said reciprocating component.

13. A valve apparatus as described in claim 10 wherein said assembly further comprises a second control arm connectable between said valve seat and said ball valve, the connection between said second control arm and said ball valve being directly opposed to the connection between said first control arm and said ball valve such that the connection between said second control arm and said ball valve defines said axis of rotation together with the connection between said first control arm and said ball valve.

14. A valve apparatus as described in claim 13 wherein said resilient member is an O-ring.

15. A valve apparatus as described in claim 13 wherein said assembly is said reciprocating component.

16. A valve assembly comprising:

a valve seat having a first end, a second end, and a valve seat passageway extending through said valve seat from said first end to said second end;

a valve ball assembly rotatably positionable adjacent said second end of said valve seat passageway for selectively sealing said valve seat passageway, said valve ball assembly comprising a ball valve;

a first control arm connectable between said valve seat and said valve ball assembly, the connection between said first control arm and said valve ball assembly defining an axis of rotation for said valve ball assembly;

a sealing means, reciprocatingly positionable in said valve seat passageway adjacent said second end of said valve seat, for preventing fluid flow between said second end of said valve seat and the exterior of said ball valve; and urging means, positionable in said passageway, for urging said sealing means against said valve ball assembly, wherein the exterior portion of said ball valve adjacent said second end of said valve seat will sealingly contact said second end of said valve seat when (a) said valve ball assembly is positioned adjacent to said second end of said valve seat, (b) said valve ball assembly is placed in closed position for sealing said passageway, and (c) a fluid pressure exceeding the fluid pressure in said passageway is exerted on the exterior portion of said valve ball assembly opposite said second end of said valve seat, wherein the exterior portion of said ball valve adjacent said second end of said valve seat will move out of contact with said second end of said valve seat when (a) said valve ball assembly is positioned adjacent said second end of said valve seat, (b) said valve ball assembly is placed in closed position for sealing said passageway, and (c) the fluid pressure in said passageway exceeds the fluid pressure exerted on the exterior portion of said valve ball assembly opposite said second end of said valve seat, and wherein said urging means continually urges said sealing means against said valve ball assembly such that said sealing means sealingly contacts said valve ball assembly when the fluid pressure in said passageway exceeds the fluid pressure exerted on the exterior portion of said valve ball assembly opposite said second end of said valve seat and said sealing means sealingly contacts said valve ball assembly when the fluid pressure in said passageway is less than the fluid pressure exerted on the exterior portion of said valve ball assembly opposite said second end of said valve seat.

17. A valve assembly as described in claim 16 wherein:

said valve seat has a radial interior surface inside said passageway;

said sealing means has a radial exterior surface; and said urging means comprises a resilient member positionable between said radial interior surface and said radial exterior surface.

18. A valve assembly as described in claim 17 wherein said resilient member is an O-ring.

19. A valve assembly as described in claim 17 wherein:

said valve ball assembly further comprises a first coupling member connectable to the exterior of said ball valve and said first coupling member is rotatably connectable to said first control arm.

20. A valve assembly as described in claim 17 further comprising a second control arm connectable between said valve seat and said valve ball assembly, the connection between said second control arm and said valve ball assembly being directly opposed to the connection between said first control arm and said valve ball assembly such that the connection between said second control arm and said valve ball assembly defines said axis of rotation together with the connection between said first control arm and said valve ball assembly.

21. A valve assembly as described in claim 20 wherein:

said valve ball assembly further comprises a first coupling member and a second coupling member, said coupling members being connectable to the exterior of said ball valve;

said first coupling member is rotatably connectable to said first control arm; and said second coupling member is rotatably connectable to said second control arm.

22. A valve assembly as described in claim 21 wherein said resilient member is an O-ring.

23. A valve apparatus comprising:

a housing;

a valve assembly positionable in said housing, said assembly comprising:

a valve seat having a first end, a second end, and a valve seat passageway extending through said valve seat from said first end to said second end, a ball assembly rotatably positionable adjacent said second end of said valve seat passageway for selectively sealing said valve seat passageway, said ball assembly comprising a ball valve having a passageway extending therethrough, a first control arm connectable between said valve seat and said ball assembly, the connection between said first control arm and said ball assembly defining an axis of rotation for said ball assembly, a floating seat positionable in said valve seat passageway adjacent said second end of said valve seat, and urging means, positionable in said valve seat passageway, for urging said floating seat against said ball assembly; and at least one operating lug positionable in said housing and associatable with said ball assembly, the association between said operating lug and said ball assembly lying outside of said axis of rotation, wherein one of said valve assembly and said operating lug is a reciprocating component which is reciprocatable in said housing and the other of said valve assembly and said operating lug is a fixed component which is positionable in fixed position in said housing such that said ball assembly can be rotated about said axis of rotation by reciprocating said reciprocating component in said housing, wherein the exterior portion of said ball valve adjacent said second end of said valve seat will sealingly contact said second end of said valve seat when (a) said ball assembly is positioned adjacent said second end of said valve seat, (b) said ball assembly is placed in closed position for sealing said valve seat passageway, and (c) a fluid pressure exceeding the fluid pressure in said valve seat passageway is exerted on the exterior portion of said ball assembly opposite said second end of said valve seat, wherein the exterior portion of said ball valve adjacent said second end of said valve seat will move out of contact with said second end of said valve seat when (a) said ball assembly is positioned adjacent said second end of said valve seat, (b) said ball assembly is placed in closed position for sealing said passageway, and (c) the fluid pressure in said passageway exceeds the fluid pressure exerted on the exterior portion of said ball assembly opposite said second end of said valve seat, and wherein said urging means continually urges said floating seat against said ball assembly such that said floating seat sealingly contacts said ball assembly when the fluid pressure in said passageway exceeds the fluid pressure exerted on the exterior portion of said ball assembly opposite said second end of said valve seat and said floating seat sealingly contacts said ball assembly when the fluid pressure in said passageway is less than the fluid pressure exerted on the exterior portion of said ball assembly opposite said second end of said valve seat.

24. A valve apparatus as described in claim 23 wherein:

said valve seat has a radial interior surface inside said valve seat passageway;

said floating seat has a radial exterior surface; and said urging means comprises a resilient member positionable between said radial interior surface and said radial exterior surface.

25. A valve apparatus as described in claim 24 wherein said resilient member is an O-ring.

26. A valve apparatus as described in claim 24 wherein said valve assembly is said reciprocating component.

27. A valve apparatus as described in claim 24 wherein:

said ball assembly further comprises a first coupling member connectable to the exterior of said ball valve and said first coupling member is rotatably connectable to said first control arm.

28. A valve apparatus as described in claim 24 wherein said valve assembly further comprises a second control arm connectable between said valve seat and said ball assembly, the connection between said second control arm and said ball assembly being directly opposed to the connection between said first control arm and said ball assembly such that the connection between said second control arm and said ball assembly defines said axis of rotation together with the connection between said first control arm and said ball assembly.

29. A valve apparatus as described in claim 28 wherein:

said ball assembly further comprises a first coupling member and a second coupling member, said coupling members being connectable to the exterior of said ball valve;

said first coupling member is rotatably connectable to said first control arm; and said second coupling member is rotatably connectable to said second control arm.

30. A valve apparatus as described in claim 29 wherein said resilient member is an O-ring.

31. A valve apparatus as described in claim 29 wherein said valve assembly is said reciprocating component.

* * * * *